United States Patent [19]

Engel et al.

[11] Patent Number: 5,060,166

[45] Date of Patent: Oct. 22, 1991

[54] METHOD AND APPARATUS FOR RAPIDLY ANALYZING AC WAVEFORMS CONTAINING DC OFFSETS

[75] Inventors: Joseph C. Engel, Monroeville; Deborah K. Mort, Wilkins Township, Allegheny County, both of Pa.

[73] Assignee: ABB Power T&D Company Inc., Blue Bell, Pa.

[21] Appl. No.: 446,739

[22] Filed: Dec. 6, 1989

[51] Int. Cl.[5] .................. H02H 3/08; G06F 15/134
[52] U.S. Cl. ............................. 364/487; 324/77 A
[58] Field of Search ............ 364/487, 481, 483, 492, 364/577; 324/77 A; 361/93, 57

[56] References Cited

U.S. PATENT DOCUMENTS

| | | | |
|---|---|---|---|
| 3,758,763 | 9/1973 | Nohara et al. | 364/487 |
| 4,577,279 | 3/1986 | Salowe | 364/483 |
| 4,625,283 | 11/1986 | Hurley | 364/487 |
| 4,694,402 | 9/1987 | McEachern et al. | 364/487 |

*Primary Examiner*—Parshotam S. Lall
*Assistant Examiner*—Ellis B. Ramirez
*Attorney, Agent, or Firm*—Richard V. Westerhoff; Rita M. Rooney

[57] ABSTRACT

A method and apparatus for rapidly analyzing ac waveforms containing dc offset by generating digitized samples of the waveform to be analyzed with alternate samples separated by ninety electrical degrees. Alternate samples are paired for calculation of the magnitude and phase of the waveform. A suitable microcomputer performs a calculation using pairs of the most recently generated samples. Using the pairs of samples, the microcomputer calculates the dc offset, and the peak magnitude of the waveform which may be voltage or current. The phase angle of the waveform can also be calculated if required. The method and apparatus are particularly useful with protective systems where the calculation is necessary to determine whether there is a fault on an electric power transmission line. In addition, the effects of dc offset are eliminated and thereby false trips are avoided. A reliable system having a fast response time at relatively modest cost is provided.

21 Claims, 2 Drawing Sheets

METHOD AND APPARATUS FOR RAPIDLY ANALYZING AC WAVEFORMS CONTAINING DC OFFSETS

BACKGROUND OF THE INVENTION

1. Field of Invention

This invention relates to determining the magnitude and phase of an ac signal in less than one cycle even with dc offset present. More particularly, the invention discloses a method and apparatus for generating samples of sinusoidal current or voltage which are then used in a mathematical solution described in the invention to determine magnitude and phase. It is particularly useful in the presence of dc offset. Use of relatively few samples with a fast response time is disclosed. The invention is described in connection with protective relays.

2. Background Information

It is often necessary in electric power transmission systems to compute the magnitude and phase of the line current or voltage. Such computations are performed, for example, in protective relays.

In the case of protective distance relays, components are placed at each terminal of the protected line segment, these components analyze line currents and voltages to determine the location of a fault and trip circuit breakers at the respective terminals to isolate a fault determined to be between terminals. The invention can be used in such a relay system to measure the current and voltage.

The calculation of line voltage and line current as well as the phase is often made more difficult by the presence of dc offset. DC offset, such as could occur when a transformer is brought on line, can cause false trips in certain protective relays.

It is known that transient exponential noise can be reduced by substituting a compensated signal for the noise using linear approximations of the exponential component. Pending U.S. Patent Application Ser. No. 207,354 discloses a method and apparatus for reducing transient exponential noise in a sinusoidal signal by determining from digital samples of the signal the slope and initial ordinate value of a linear approximation of the transient exponential noise. The invention derives compensated values of current and voltage directly from digital samples of the waveform, and provides such compensated values from the beginning of the transient within one-half cycle of transient initiation plus one additional sample interval The compensation involves deriving the slope of the linear approximation of the exponential component of the transient by adding the magnitudes of each of a first pair of digital samples for instants spaced one-half cycle apart to produce a sum, subtracting from this sum the magnitude of each of a second pair of digital samples also one-half cycle apart and spaced from a corresponding one of the first pair of digital samples by a preselected number to produce a result.

The ordinate value of the linear approximation of the exponential component of the transient is determined by calculating the average of the magnitudes of the first pair of digital samples and adding to that average the sum of the magnitudes of the first pair minus the sum of the magnitude of the second pair divided by the number of intervals between corresponding samples in the first and second pairs of samples.

The method and apparatus discussed above does not involve calculation of magnitude and phase from alternate samples which are spaced by ninety electrical degrees of the waveform. In addition, there remains a need for a method and apparatus for accurate calculation of magnitude and phase in the presence of dc offset using relatively few samples and having a response time of less than one-half cycle.

As can be seen from the above, there is a need in many applications for a technique for rapidly analyzing waveforms, preferably in less than one power cycle. Further, the calculation must be made on-line with relatively modest hardware if it is to be cost competitive.

SUMMARY OF THE INVENTION

These and other needs are satisfied by the invention which is directed to a closed-form mathematical solution to the difficulty in measurement of magnitude and phase described above. The present invention provides for accurate determination of magnitude and phase even in the presence of dc offset.

The invention assumes sinusoidal currents and voltages. The invention is based on generating samples of the relevant electrical parameter, i.e., either current or voltage, with alternate samples separated by ninety electrical degrees of the line current or voltage, as the case may be. For computational purposes, those alternate samples are paired. For example, a first sample is generated which may be the first component of a first pair, the next sample is generated which would be the first component of a second pair, a third sample is generated at ninety electrical degrees of the line current or voltage from the first sample and that third sample would be the second component of the first pair. Another sample is then generated ninety electrical degrees apart from the second sample, and this completes the second pair, and so on. This generating sequence continues as long as the invention is in use.

Under certain conditions, which are described more fully hereinbelow, eight samples (four pairs) are required for performing the calculation of magnitude and phase Under other conditions, four samples (two pairs) are sufficient. In the latter case, the mathematical computation is continuously performed on the four most recent samples. In the former case, the computation would be continuously performed on the eight most recent samples. As a new sample is generated the oldest sample is discarded and the computation, which is described in detail below, is performed on the newest samples.

As mentioned above, the invention is directed to an ac electric power transmission system having sinusoidal currents and voltages which may also have decaying dc offset. The invention involves generating digitized samples of current or voltages at the predetermined intervals and performing certain calculations using pairs of the samples to determine the dc offset and the magnitude of the desired electrical parameter (i.e. current or voltage). In a preferred form the samples are generated at intervals of forty-five degrees of the waveform, and alternate samples are paired for the purpose of calculation of magnitude and phase.

If required in the application of the present invention, the magnitude as determined may be compared to a predetermined value and if it is equal to or in excess of that predetermined value, a signal is generated to trigger a desired event, such as tripping a circuit breaker.

In addition, the invention includes circuitry discussed in further detail herein which allows the calculation process to continue as new samples are generated.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
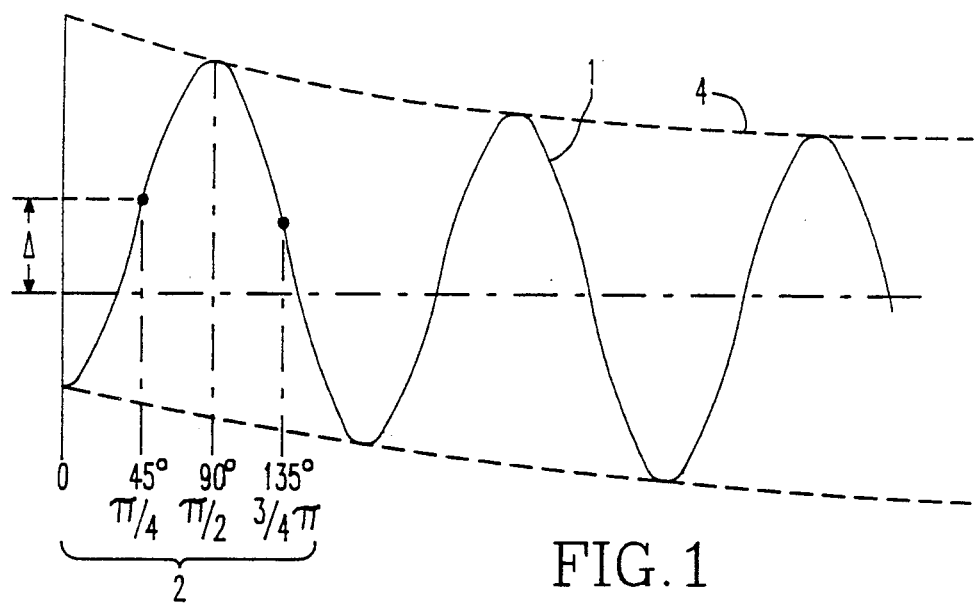
FIG. 1 is a waveform diagram indicating current, dc offset, and indicating a set of sample points for the electric power system with which one preferred embodiment of the invention may be used.

FIG. 1 illustrates the sinusoidal waveform 1 of the current in a typical electric power transmission system with which a preferred embodiment of the invention may be used. The current is depicted by waveform 1 and the samples 2 are taken at predetermined intervals. FIG. 1 also depicts dc offset present in the current of the system, which can be induced, for instance by switching a reactive load onto the system. The dc offset $\Delta$ having decay constant $\alpha$ is decaying as depicted by line 4 The magnitude I of the peak value of the current of waveform 1 may be described in the following equation:

$$i_k = I \sin \theta' \Delta_k \qquad \text{Eq. (1)}$$

where $i_k$ represents the instantaneous value of the sample;

I represents the peak value of the sinusoidal component;

$\theta$ represents the phase angle at the first sampled point; and $\Delta_k$ represents the dc offset of the Kth sample.

As mentioned above pairs of samples are generated with the samples in each pair 90 electrical degrees of the current fundamental frequency apart. Successive samples are taken within ninety degrees of the preceding sample. In the preferred form, two interleaved pairs spaced 45 electrical degrees apart are used. The samples are taken continuously at 45 degree intervals with the four most recent samples retained so that a new calculation can be made every 45 degrees. As can be seen from FIG. 1, the minimum response time in the preferred form will be slightly more than ⅜ of a cycle. This would include the computational speed of the hardware which would depend upon the microprocessor used in the application. In the exemplary embodiment, a conventional 16-bit general purpose processor is contemplated which would require approximately 200 microseconds to perform the algorithm of the present invention. It should be understood that other processing units may be used which could be faster or slower in computing the algorithm. As noted above, successive samples must be taken within ninety degrees of the preceding sample. This means that the maximum response time is slightly less than ½ cycle.

The samples so generated are used in the above equation as follows:

$$i_1 = I \sin \theta + \Delta_1$$

$$i_2 = I (\sin \theta + \pi/4) + \Delta_2$$

$$i_3 = I (\sin \theta + \pi/2) + \Delta_3, \text{ or } i_3 = I \cos \theta + \Delta_3$$

$$i_4 = I (\sin \theta + 3\pi/4) + \Delta_4, \text{ or } i_4 = I \cos (\theta + \pi/4) + \Delta_4 \qquad \text{Eq. (2)}$$

squaring both sides and summing, and using the identity:

$$\sin^2 \theta + \cos^2 \theta = 1$$

The following may be obtained:

$$(i_1 - \Delta_1)^2 + (i_3 - \Delta_3)^2 = I^2$$

$$(i_2 - \Delta_2)^2 + (i_4 - \Delta_4)^2 = I^2 \qquad \text{Eq. (3)}$$

It is known that where samples are taken at equal intervals, the decaying dc offset $\Delta_k$ at any point in time may be described as follows:

$$\Delta_k = a^{(k-1)} \times \Delta \qquad \text{Eq. (4)}$$

where $\alpha$ is the per-unit decay between samples. If samples are not taken at equal intervals, then K cannot be assumed to be equal to 1, 2, 3, 4 ... etc. Instead K would have to be incremented differently and this would be known to one skilled in the art. Returning to equations (3), substituting as above for $\Delta_k$ and eliminating $I^2$ yields $$(1 - \alpha^2 + \alpha^4 - \alpha^6)\Delta^2 - 2(i_1 - \alpha i_2 + \alpha^2 i_3 - \alpha^3 i_4)\Delta + \qquad \text{Eq. (5)}$$
$$(i_1^2 - i_2^2 + i_3^2 - i_4^2) = 0$$

It can be seen that this is a quadratic equation for $\Delta$. It can be solved if the decay constant $\alpha$ is known.

Alternatively, in cases where there is a comparatively long dc offset, the decay in one-half cycle is negligible. In such a case, the assumption may be made that $\alpha$ is equal to 1. In that case, equation (5) becomes:

$$\Delta = \frac{i_1^2 - i_2^2 + i_3^2 - i_4^2}{2(i_1 - i_2 + i_3 - i_4)} \qquad \text{Eq. (6)}$$

$\Delta$ is then calculated from equation (6). Now, the magnitude I can be calculated from equation (3) above. The phase angle $\theta$ can be calculated from equation (2) above.

If, on the other hand, $\alpha$ is not known and if it were determined that in the application the error in assuming $\alpha$ to be equal to one would be too great, then four additional samples would be required to yield two equations (5) with two unknowns which can be solved for $\alpha$ and then for $\Delta$. Thereafter, magnitude I can be calculated from equation (3) and the phase angle $\theta$ can be calculated from equation (2).

The sampling algorithm set forth above allows determination of magnitude and phase with as few as four samples of current or voltage to be taken in less than ½ cycle of the powerline.

Figure 2:
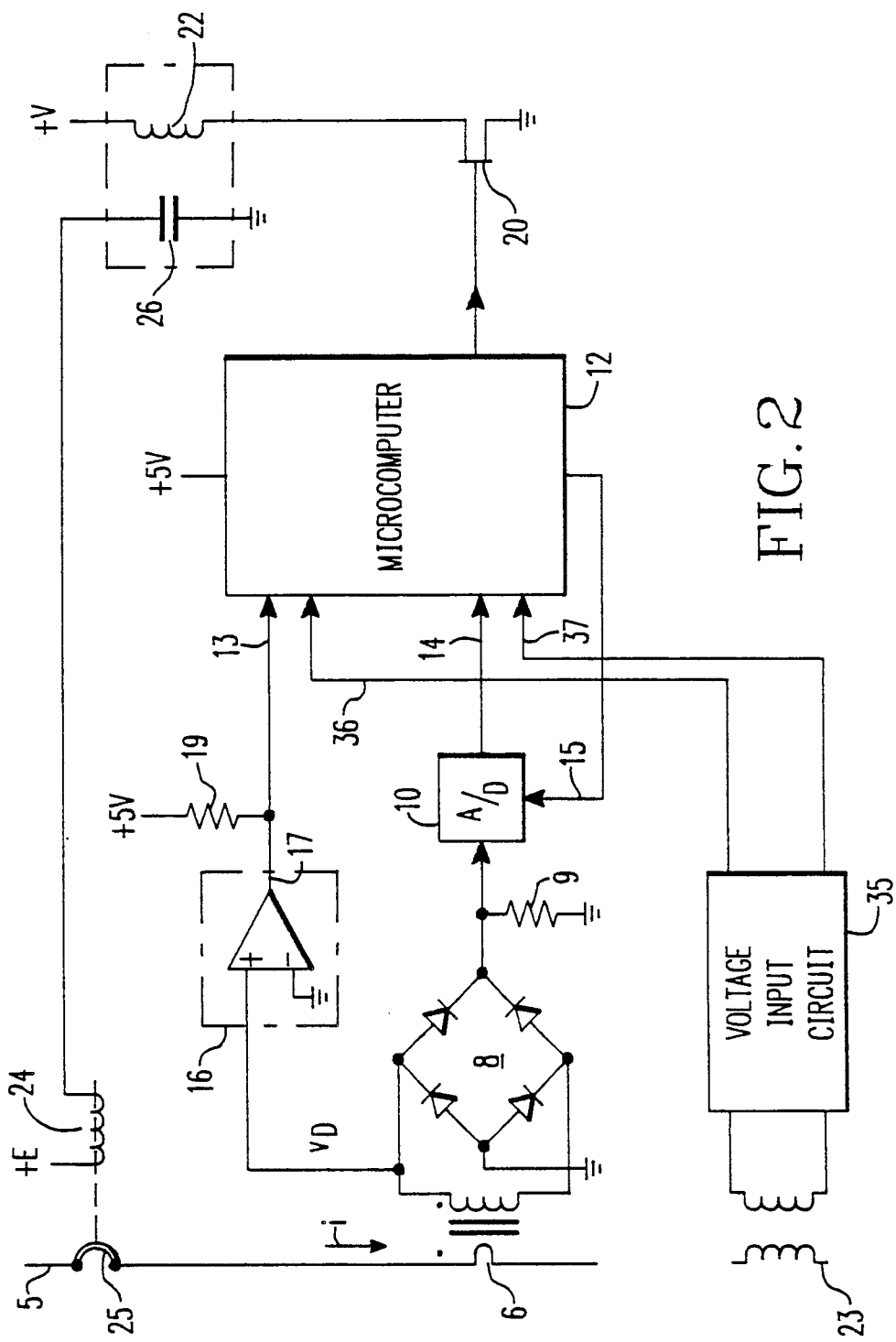
FIG. 2 is a diagram of a circuit incorporating the invention.

Application of the invention to a protective relay in an ac electric power transmission system is depicted in the circuit diagram of FIG. 2 While a single phase circuit is shown in FIG. 2, it should be understood that the invention would actually be used in conjunction with a three phase system and an identical circuit as shown in FIG. 2 would be present for each phase of the system. The microcomputer (discussed below) would perform the relevant calculations for each phase Referring now to FIG. 2, in one embodiment of the invention, transmission line 5 has first phase current i having a sinusoidal waveform Current transformer 6 generates a current proportional to the current in the line 5.

Samples of current for use in the calculation of magnitude and phase are generated as follows: the ac current i is converted into a dc current by full wave rectifier 8. Resistor 9 converts the rectified output current from rectifier 8 to a voltage signal which is proportional to the magnitude of the current in the line. Unipolar analog-to-digital converter 10 accepts the positive voltage and generates at output 14 digitized samples representative of the amplitude of the current. Microcomputer 12 receives the digitized samples as inputs and is suitably programmed, as discussed hereinbelow, to perform the calculations required to produce the magnitude and phase of the current. Microcomputer 12 controls the sampling rate at which analog-to-digital converter 10 generates samples of the current for use in the calculations by a pulse sent to input 15 of analog-to-digital converter 10.

Microcomputer 12 must also receive information regarding the sign of the current. In the exemplary embodiment of the invention, the voltage $V_D$ across the ac inputs to the full wave bridge rectifier 8, is applied to a comparator 16 which compares $V_D$ to ground to generate a logic signal representative of the sign of i. It can be seen that when i is positive, the logic signal is equal to +5 V applied through resister 19. When i is negative, the logic signal is pulled to ground. This logic signal provides information about the sign of the current to input 13 of microcomputer 12.

Alternatively, an analog-to-digital converter in a bipolar mode (not shown) could be used. This would avoid the necessity of full wave rectifier 8. Both sign and amplitude would be generated from such an analog-to-digital converter.

Using the information about amplitude and sign, microcomputer 12 performs the calculations described above to generate present values for magnitude, phase and dc offset. In the preferred embodiment, the invention may be used in a protective relay system. Microcomputer 12 could be suitably programmed as discussed below to further perform a comparison of the magnitude of current to a predetermined value. If the magnitude of current exceeds this predetermined value, microcomputer 12 would generate a high output signal which would effect a response in the system. For example, the invention may be used in conjunction with an overcurrent relay in which the value of the magnitude of the current is compared to a set point and if it exceeds that set point, the output signal is high. This would ultimately effect an interruption of the system, by tripping a circuit breaker, for example In the exemplary embodiment, the output 18 of microcomputer 12 is applied to the gate of a FET 20. FET 20 is turned on when the output of the microcomputer 12 goes high. When FET 20 is turned on, coil 22 is energized and normally open contact 26 is closed Trip coil 24, in turn, becomes energized. This trips breaker 25 and the system is thereby protected.

In other applications, it is desired to measure the voltage in the system in addition to or in place of the current. As shown in FIG. 2 the circuit may also include appropriate components adapted to generate samples of voltage and perform calculations on voltage samples. In such a case potential transformer 23 is placed on line 5. The amplitude of the voltage of one phase would be generated by applying the output of potential transformer 23 to a suitable voltage input circuit 35. Voltage input circuit 35 would include elements similar to those contained in the circuit in relation to current transformer 6. For example, the voltage output would be full-wave-rectified and a suitable resistance would be placed across the output of the resistance (not shown). This would be applied to a unipolar analog-to-digital converter which would thereby generate the magnitude information which would be provided to input 37 of microcomputer 12. Sign information would be generated by a combination similar to comparator 16 and resistor 19 as discussed above and this signal would provide sign information to input 36 of microcomputer 12.

Figure 3:
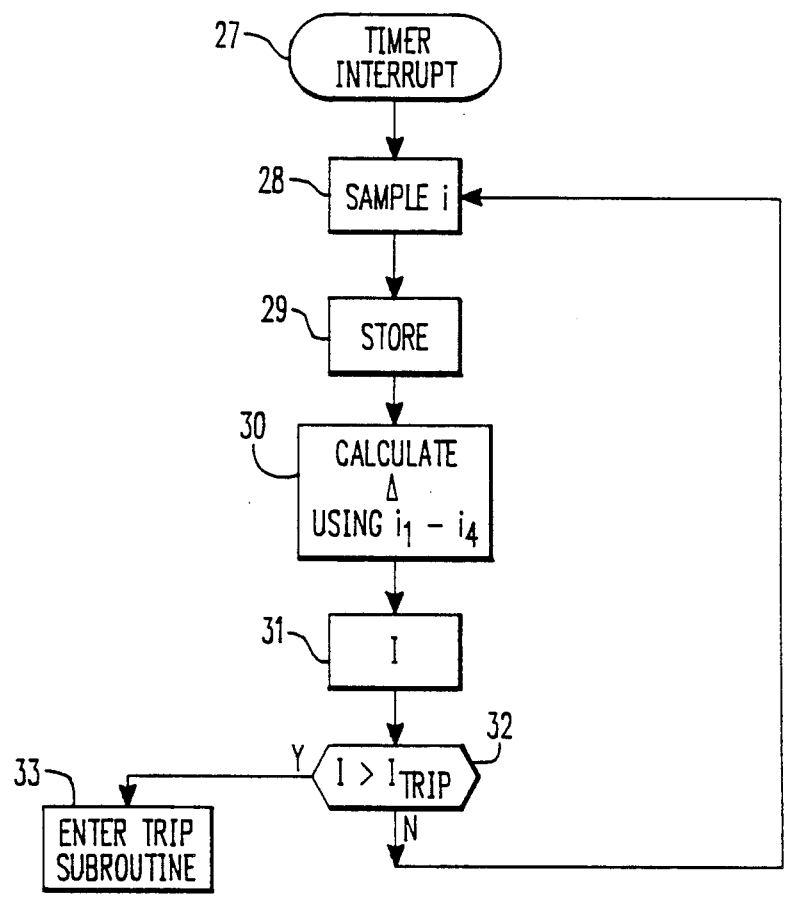
FIG. 3 is a flow chart of a suitable microcomputer program which can be used to implement the invention.

Preferably samples would be generated at intervals of forty-five degrees of the line voltage Microcomputer 12 would perform the calculations of magnitude and phase. In addition, microcomputer 12 could be adapted to further perform a comparison function or a monitoring function as required in the relevant application Referring now to FIG. 3, the flow chart of a suitable program for microcomputer 12 of FIG. 2 is shown. Timer interrupt subroutine 27 regulates the intervals at which the calculations are performed. The samples, $i_k$, are generated as inputs to the microcomputer 28. Each sample is stored, 29, as it is generated. Depending upon the circumstances of the relevant application of the invention the four or eight most recently stored samples are always retained. As a new sample is stored, the least recent sample is discarded. At 30, the dc offset $\Delta$ is calculated using the four most recent samples, $i_1$, $i_2$, $i_3$ and $i_4$, in equation (6). In one embodiment of the invention, the magnitude of current I is then calculated, at 31, using equations (3). In another application, four more samples would be required to solve two equations (5) with two unknowns. Then the magnitude of the current I could be calculated using equation (3) as discussed in detail above.

A comparison may be made between I and a predetermined value, $I_{trip}$, 32. If the value is greater than $I_{trip}$, then a suitable trip subroutine 33, which would be known to one skilled in the art, is called.

It should be understood that the invention may also be used to monitor currents and voltages and does not necessarily require the comparison of magnitude to a predetermined value.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An apparatus for measuring the magnitude of an ac waveform within less than one cycle of the waveform despite the presence of dc offset, said apparatus comprising:

means continuously generating a plurality of digitized samples of the magnitude of said waveform, said samples being generated at spaced intervals with alternate samples separated by ninety electrical degrees of the waveform, and with each successful sample generated within ninety electrical degrees of the preceding sample, and digital computer means including means storing said samples and means generating output signals representative of the dc offset and the magnitude of said waveform from pairs of said samples taken in less than one cycle of the waveform with samples in each pair being ninety electrical degrees apart.

2. The apparatus of claim 1 wherein said digital computer means includes means generating said output signal representative of the magnitude of the waveform using four pairs of samples of said waveform formed of the eight most recently generated samples, with the pairs comprised of interleaved samples with samples in each pair separated by ninety electrical degrees of the waveform.

3. The apparatus of claim 2 wherein said digital computer means includes means generating said output signal representative of the magnitude of the waveform using two pairs of samples of said waveform formed of the four most recently generated samples, with the pairs comprised of interleaved samples with the samples in each pair separated by ninety electrical degrees of the waveform.

4. The apparatus of claim 3 wherein said sampling means generates samples at equally spaced intervals.

5. The apparatus of claim 4 wherein said sampling means generates samples at spaced intervals of forty-five electrical degrees of said waveform.

6. The apparatus of claim 5 wherein said digital computer means includes means generating an output signal representative of the phase angle of the waveform from the magnitude of the waveform and the dc offset as determined from said pairs of samples.

7. The apparatus of claim 6 wherein the ac waveform is current in combination with a circuit breaker for interruption of an electric power distribution system, including means for tripping the circuit breaker if the magnitude of current exceeds a predetermined value.

8. The apparatus of claim 6 wherein said output signal representative of magnitude is generated for waveforms of current and voltage, in combination with a distance measuring relay means in an electric power distribution system, said distance measuring relay means having means generating a trip signal if said relay means determines, based upon said magnitudes of current and voltage, that there is a fault within its assigned protection zone.

9. In an ac electric power transmission system, an apparatus for computing magnitude of the line current within one cycle of the power line, despite the presence of dc offset, comprising:

sampling means continuously generating a plurality of digitized samples of the magnitude of the line current, said samples being generated at spaced intervals with alternate samples separated by ninety electrical degrees of the line current, and with each successive sample generated within ninety electrical degrees of the preceding sample;

digital computer means including means storing said samples and means generating output signals representative of the dc offset and the magnitude of the line current from a predetermined number of pairs of said samples taken in less than one cycle of the waveform, with samples in each pair being ninety electrical degrees apart; and means generating a signal if the magnitude of the line current exceeds a predetermined value and means effective a corrective response to said signal.

10. The apparatus of claim 9 wherein said digital computer means includes means generating said output signal representative of the dc offset and the magnitude of the line current using four pairs of samples formed of the eight most recently generated samples, with the pairs comprised of interleaved samples with the samples in each pair separated by ninety electrical degrees of the line current.

11. The apparatus of claim 10 wherein said digital computer means includes means generating said output signal representative of the magnitude of the line current using two pairs of samples of said line current formed of the four most recently generated samples, with the pairs comprised of interleaved samples with samples in each pair separated by ninety electrical degrees of the line current.

12. The apparatus of claim 11 wherein said sampling means generates samples at equally spaced intervals.

13. The apparatus of claim 12 wherein said sampling means generates samples at spaced intervals of forty-five electric degrees of said line current.

14. The apparatus of claim 13 wherein said digital computer means includes means generating an output signal representative of the phase angle of the line current using the magnitude of the line current and the dc offset as determined from said pairs of samples.

15. The apparatus of claim 9 wherein said apparatus also includes means generating an output signal representative of the magnitude of the line voltage in combination with a protective relay means comprising a distance measuring relay means having means generating a trip signal if, based upon said magnitudes of current and voltage, it is determined that there is a fault within the assigned protection zone of said distance measuring relay means.

16. The apparatus of claim 9 including protective relay means comprising an overcurrent relay having means responsive to said signaling means if the magnitude of the current exceeds the predetermined value.

17. A method for analyzing ac waveforms with dc offsets, characterized by the steps of:

determining the minimum number of digitized samples of said waveform necessary to calculate the magnitude and phase of the waveform based upon a predetermined value for the decay constant of the dc offset, generating a plurality of digitized samples of the magnitude of said waveform at spaced intervals with alternate samples separated by ninety electrical degrees of said waveform, and with each successive sample generated within ninety degrees of the preceding sample, continuously storing in a digital computer each sample with the minimum number of most recent samples being retained, and discarding the least recent sample, and generating an output signal representative of the dc offset and the magnitude of the waveform from of said samples taken in less than one cycle of the waveform, with samples in each pair being ninety electrical degrees apart.

18. The method of claim 17 including generating said samples at equally spaced intervals.

19. The method of claim 18 including generating said samples at spaced intervals of forty-five degrees of the waveform.

20. The method of claim 17 including comparing said output signal representative of said magnitude of the waveform to a predetermined value and generating a signal to cause a protective event in the event of the magnitude exceeding said predetermined value.

21. The method of claim 17 including generating an output signal representative of the phase angle of the waveform from the dc offset and the magnitude of the waveform.

* * * * *